(12) United States Patent
Roth et al.

(10) Patent No.: US 8,676,530 B2
(45) Date of Patent: Mar. 18, 2014

(54) SYSTEM AND METHOD FOR VARIATION TESTING FOR PERFORMANCE TEST

(75) Inventors: Steven Leslie Roth, Westminster, CO (US); Matthew S. Maccaux, Westminster, CO (US)

(73) Assignee: Oracle International Corporation, Redwood Shores, CA (US)

( * ) Notice: Subject to any disclaimer, the term of this patent is extended or adjusted under 35 U.S.C. 154(b) by 287 days.

(21) Appl. No.: 11/626,281

(22) Filed: Jan. 23, 2007

(65) Prior Publication Data

US 2007/0180096 A1 Aug. 2, 2007

Related U.S. Application Data

(62) Division of application No. 11/527,092, filed on Sep. 26, 2006.

(60) Provisional application No. 60/721,142, filed on Sep. 27, 2005.

(51) Int. Cl.
*G06F 11/34* (2006.01)
*G01D 21/00* (2006.01)

(52) U.S. Cl.
USPC .... 702/123; 73/865.8; 324/73.1; 324/750.01; 324/750.02; 702/1; 702/127; 702/182; 702/186; 702/187; 702/189; 709/224; 714/E11.192

(58) Field of Classification Search
USPC .............. 702/81, 82, 84, 108, 121, 123, 702/177–179, 182, 186, 1, 33, 34, 85, 90, 702/127, 176, 187, 189; 717/124, 135, 100; 73/431.1, 865.8, 865.9, 866.3; 324/500, 537, 750.01, 750.02, 762.01, 324/862.02, 862.03, 862.05, 862.06, 324/863.01; 340/500, 540, 679; 700/1, 28, 700/32, 33, 34, 36, 38, 90; 709/220, 221, 709/222, 223, 224; 713/1, 2, 100; 714/1, 714/25, 37, 47.1, 100, E11.001, E11.02, 714/E11.179, E11.18, E11.181, E11.182, 714/E11.184, E11.188, E11.189, E11.192, 714/E11.193, E11.194, E11.197, E11.198, 714/E11.2, E11.202
IPC ..... G01D 7/00,9/00, 21/00, 21/02; G06F 11/00, G06F 11/008, 11/30, 11/3003, 11/3006, 11/32, G06F 11/34, 11/3409, 11/3414, 11/3428, G06F 11/3433, 17/00, 17/40, 19/00, 2011/00, G06F 2201/00, 2201/875; H04L 12/00, 12/02, H04L 12/26, 12/2602, 12/2697, 43/00, 43/08, H04L 43/50
See application file for complete search history.

(56) References Cited

U.S. PATENT DOCUMENTS 2,883,255 A * 4/1959 Anderson ................... 346/34
3,199,025 A * 8/1965 Stone et al. ............... 324/537

(Continued)

OTHER PUBLICATIONS

IBM Technical Disclosure Bulletin NN9105156, May 1, 1991.*

*Primary Examiner* — Edward Cosimano
(74) *Attorney, Agent, or Firm* — Meyer IP Law Group

(57) ABSTRACT

A performance testing framework enables multiple components working together to test a deployed application automatically in an unattended manner and to analyze the test results easily. At very high level, the performance testing framework can run performance tests on a tested system with one or more variations without user intervention and save the test results and configuration metadata to a database for later analysis. Each of the variations is composed of a set of logical dimensions and values associated with each of those dimensions to be tested.

21 Claims, 5 Drawing Sheets

(56) References Cited

U.S. PATENT DOCUMENTS

| | | | |
|---|---|---|---|
| 3,321,613 A * | 5/1967 | Searle | 702/182 |
| 5,062,055 A * | 10/1991 | Chinnaswamy et al. | 702/182 |
| 5,812,780 A * | 9/1998 | Chen et al. | 709/224 |
| 5,881,268 A * | 3/1999 | McDonald et al. | 703/21 |
| 5,974,572 A | 10/1999 | Weinberg et al. | 714/47 |
| 6,434,513 B1 * | 8/2002 | Sherman et al. | 702/186 |
| 6,567,767 B1 | 5/2003 | Mackey et al. | 702/186 |
| 6,581,169 B1 | 6/2003 | Chen et al. | |
| 6,738,813 B1 * | 5/2004 | Reichman | 709/224 |
| 6,775,644 B2 * | 8/2004 | Myers | 702/186 |
| 7,047,446 B1 * | 5/2006 | Maurer et al. | 714/38 |
| 7,082,381 B1 * | 7/2006 | Saghier et al. | 702/182 |
| 7,092,995 B2 | 8/2006 | Kaler et al. | |
| 7,133,805 B1 * | 11/2006 | Dankenbring et al. | 702/186 |
| 7,275,020 B2 * | 9/2007 | Sutton | 702/186 |
| 7,421,621 B1 | 9/2008 | Zambrana | 714/38 |
| 7,464,294 B2 * | 12/2008 | Di Palma et al. | 714/21 |
| 7,587,638 B2 * | 9/2009 | Shah et al. | 714/47.3 |
| 7,840,652 B2 * | 11/2010 | Schran et al. | 709/220 |
| 8,069,231 B2 * | 11/2011 | Schran et al. | 709/221 |
| 2001/0034771 A1 | 10/2001 | Hutsch et al. | |
| 2002/0138443 A1 * | 9/2002 | Schran et al. | 705/64 |
| 2002/0177977 A1 * | 11/2002 | Scarlat et al. | 702/186 |
| 2003/0028828 A1 | 2/2003 | Kakimoto | |
| 2003/0033406 A1 | 2/2003 | John et al. | |
| 2003/0074606 A1 * | 4/2003 | Boker | 714/42 |
| 2004/0039550 A1 * | 2/2004 | Myers | 702/186 |
| 2004/0064531 A1 | 4/2004 | Wisner | |
| 2004/0068554 A1 | 4/2004 | Bales et al. | |
| 2004/0215762 A1 | 10/2004 | Oulu et al. | |
| 2004/0261032 A1 | 12/2004 | Olander et al. | |
| 2005/0122987 A1 | 6/2005 | Ignatowski et al. | |
| 2005/0193258 A1 * | 9/2005 | Sutton | 714/32 |
| 2005/0262117 A1 | 11/2005 | Jolley | |
| 2006/0015421 A1 | 1/2006 | Grimberg | |
| 2006/0036993 A1 | 2/2006 | Buehler et al. | |
| 2006/0069995 A1 | 3/2006 | Thompson et al. | |
| 2006/0080014 A1 * | 4/2006 | Di Palma et al. | 701/41 |
| 2006/0195725 A1 * | 8/2006 | Shah et al. | 714/38 |
| 2006/0224375 A1 * | 10/2006 | Barnett et al. | 703/22 |
| 2006/0248103 A1 | 11/2006 | Belcher | |
| 2006/0265190 A1 | 11/2006 | Hein | |
| 2007/0006069 A1 | 1/2007 | Smith et al. | |
| 2007/0079289 A1 * | 4/2007 | MacCaux | 717/124 |
| 2007/0079290 A1 * | 4/2007 | Roth | 717/124 |
| 2007/0079291 A1 * | 4/2007 | Roth | 717/124 |
| 2007/0083630 A1 * | 4/2007 | Roth et al. | 709/223 |
| 2007/0083631 A1 * | 4/2007 | Maccaux | 709/223 |
| 2007/0083632 A1 * | 4/2007 | Roth | 709/223 |
| 2007/0083633 A1 * | 4/2007 | Roth | 709/223 |
| 2007/0083634 A1 * | 4/2007 | Roth | 709/223 |
| 2007/0083793 A1 * | 4/2007 | Roth | 714/25 |
| 2007/0177446 A1 * | 8/2007 | Roth | 365/230.03 |
| 2007/0180092 A1 * | 8/2007 | Roth et al. | 709/223 |
| 2007/0180093 A1 * | 8/2007 | Roth et al. | 709/223 |
| 2007/0180094 A1 * | 8/2007 | Roth | 709/223 |
| 2007/0180095 A1 * | 8/2007 | Roth | 709/223 |
| 2007/0180097 A1 * | 8/2007 | Roth | 709/223 |
| 2007/0185984 A1 * | 8/2007 | Roth | 709/223 |
| 2011/0066708 A1 * | 3/2011 | Schran et al. | 709/221 |

* cited by examiner

SYSTEM AND METHOD FOR VARIATION TESTING FOR PERFORMANCE TEST

CLAIM OF PRIORITY

This application is a divisional of U.S. patent application Ser. No. 11/527,092, filed Sep. 26, 2006, entitled "System and Method for Performance Testing Framework" by Steven Leslie Roth et al. which claims benefit from expired U.S. Provisional Patent Application No. 60/721,142, filed Sep. 27, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is related to the following applications which are hereby incorporated by reference in their entirety:

U.S. patent application Ser. No. 11/625,246, entitled SYSTEM AND METHOD FOR FLEXIBLE PERFORMANCE TEST by Steven Leslie Roth and Matthew S. Maccaux filed Jan. 19, 2007, now abandoned.

U.S. patent application Ser. No. 11/625,215, entitled SYSTEM AND METHOD FOR FULL RESULTS AND CONFIGURATION STORAGE FOR PERFORMANCE TEST by Steven Leslie Roth and Matthew S. Maccaux filed Jan. 19, 2007, now abandoned.

U.S. patent application Ser. No. 11/625,233, entitled SYSTEM AND METHOD FOR APPLICATION CONFIGURATION FOR PERFORMANCE TEST by Steven Leslie Roth filed Jan. 19, 2007, now abandoned.

U.S. patent application Ser. No. 11/625,403, entitled SYSTEM AND METHOD FOR ERROR PATTERN MATCHING FOR PERFORMANCE TEST by Steven Leslie Roth filed Jan. 22, 2007, now abandoned.

U.S. patent application Ser. No. 11/626,260, entitled SYSTEM AND METHOD FOR CENTRALIZED CONFIGURATION AND PROPAGATION FOR PERFORMANCE TEST by Steven Leslie Roth filed Jan. 23, 2007, now abandoned.

U.S. patent application Ser. No. 11/626,292, entitled SYSTEM AND METHOD FOR PORTAL GENERATOR FOR PERFORMANCE TEST by Steven Leslie Roth filed Jan. 23, 2007, now abandoned.

Pending U.S. patent application Ser. No. 11/626,281, entitled SYSTEM AND METHOD FOR ISSUE SEVERITY HANDLING FOR PERFORMANCE TEST by Steven Leslie Roth filed Jan. 23, 2007.

U.S. patent application Ser. No. 11/527,843, entitled SYSTEM AND METHOD FOR PLUGGABLE GOAL NAVIGATOR FOR PERFORMANCE TEST by Steven Leslie Roth, filed Sep. 27, 2006, now abandoned.

U.S. patent application Ser. No. 11/528,170, entitled SYSTEM AND METHOD FOR GOAL-BASED DISPATCHER FOR PERFORMANCE TEST by Steven Leslie Roth, filed Sep. 27, 2006, now abandoned.

U.S. patent application Ser. No. 11/527,962, entitled SYSTEM AND METHOD FOR OPTIMIZING EXPLORER FOR PERFORMANCE TEST by Steven Leslie Roth, filed Sep. 27, 2006, now abandoned.

U.S. patent application Ser. No. 11/527,967, entitled SYSTEM AND METHOD FOR HIGH-LEVEL RUN SUMMARIZATION FOR PERFORMANCE TEST by Steven Leslie Roth, filed Sep. 27, 2006, now abandoned.

U.S. patent application Ser. No. 11/527,790, entitled SYSTEM AND METHOD FOR QUICK RANGE FINDER FOR PERFORMANCE TEST by Matthew S. Maccaux, filed Sep. 27, 2006, now abandoned.

U.S. patent application Ser. No. 11/528,064, entitled SYSTEM AND METHOD FOR DYNAMIC ANALYSIS WINDOW FOR ACCURATE RESULT ANALYSIS FOR PERFORMANCE TEST by Steven Leslie Roth, filed Sep. 27, 2006, now abandoned.

U.S. patent application Ser. No. 11/528,010, entitled SYSTEM AND METHOD FOR DIMENSIONAL EXPLORER FOR PERFORMANCE TEST by Steven Leslie Roth, filed Sep. 27, 2006, now abandoned.

U.S. patent application Ser. No. 11/527,818, entitled SYSTEM AND METHOD FOR QUEUED AND ON-DEMAND TESTING FOR PERFORMANCE TEST by Matthew S. Maccaux, filed Sep. 27, 2006, now abandoned.

FIELD OF THE INVENTION

This invention relates to the field of performance testing of a deployed application software.

BACKGROUND

Performance testing of an application measures one or more of the followings:
Response time: how the application performs when under load, i.e., what is the average response time during an average load and what is it during a peak load.
Capacity: what the maximum threshold for the application is under a given set of conditions, i.e., what is the maximum number of transactions (or pages) per second that the server can process and how many concurrent users are on the system at this point.
Scalability: how well the application responds to increasing load (requests to the server) by adding additional resources (which can be but are not limited to, more CPU's, memories, and physical boxes), i.e., how does the throughput change as we add resources and how does the response time change as users are added to the system.

Most commonly, response time and the throughput of the system are used as measurements for these terms.

Performance testing of an application can be a daunting and seemingly confusing task if not approached with the proper plan in place. Like any software development process, requirements must be gathered, business needs should be understood, and a formal schedule should be laid out well in advance of the actual testing. The requirements for the performance testing should be driven by the needs of the business and should be explained with a set of use cases. These can be based on historical data (say what the load pattern was on the server for a week) or approximations based on anticipated usage.

Early on in the development cycle of an application, benchmark tests should be used to determine if there are any performance regressions in the application. Benchmark tests are great for gathering repeatable results in a relatively short period of time. The best way to benchmark is by changing one and only one parameter between tests. For a non-limiting example, the impact of increases in Java Virtual Machine (JVM) memory on the performance of the application can be measured by incrementing the JVM memory in stages (going from say, 1024 MB to 1224 MB, then to 1524 MB and to 2024 MB) and stopping at each stage to gather the results and environment data, record it and then move on to the next test. This way there will be a clear trail to follow back when the results of the tests are analyzed.

Later on in the development cycle of an application, once the bugs have been worked out of the application and it has reached a stable point, more complex types of tests can be run to determine how the system will perform under different load patterns. These types of tests are usually referred to as: Capacity Planning, Soak Tests, and Peak-Rest Tests. These tests are designed to test real-world type scenarios by testing the reliability, robustness, and scalability of the application. For a non-limiting example, capacity planning tests are generally used with slow ramp-ups (defined below), but if the application sees quick bursts of traffic during a period of the day, then the test should certainly be modified to reflect this. Keep in mind that change of variables in the test (such as the period of ramp-up or the think-time of the users) will cause the outcome of the test to vary. Therefore, it is always a good idea to run a series of baseline tests first to set a known controlled environment to later compare your changes with.

There are many different ways to go about performance testing of an application, some of them more difficult than others. For repeatability, benchmark testing is the best methodology. However, to test the upper limits of the application in regards to concurrent user-load, capacity planning tests should be used.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.
Overall Performance Testing Framework The present invention enables a performance testing framework that enables multiple components working together to test a deployed application automatically in an unattended manner and to analyze the test results easily. Here, the application can be but is not limited to a portal of a Web-based service. At very high level, the performance testing framework can run performance tests with one or more variations (test configurations) on a tested system without user intervention and save the test results and configuration metadata to a database for later analysis. Each of the variations is composed of a set of logical dimensions and values associated with each of those dimensions to be tested . . . . Optionally, low-level tools can be run individually as part of a manual testing scenario to cover areas not fully supported by the framework at the high level.

Figure 1:
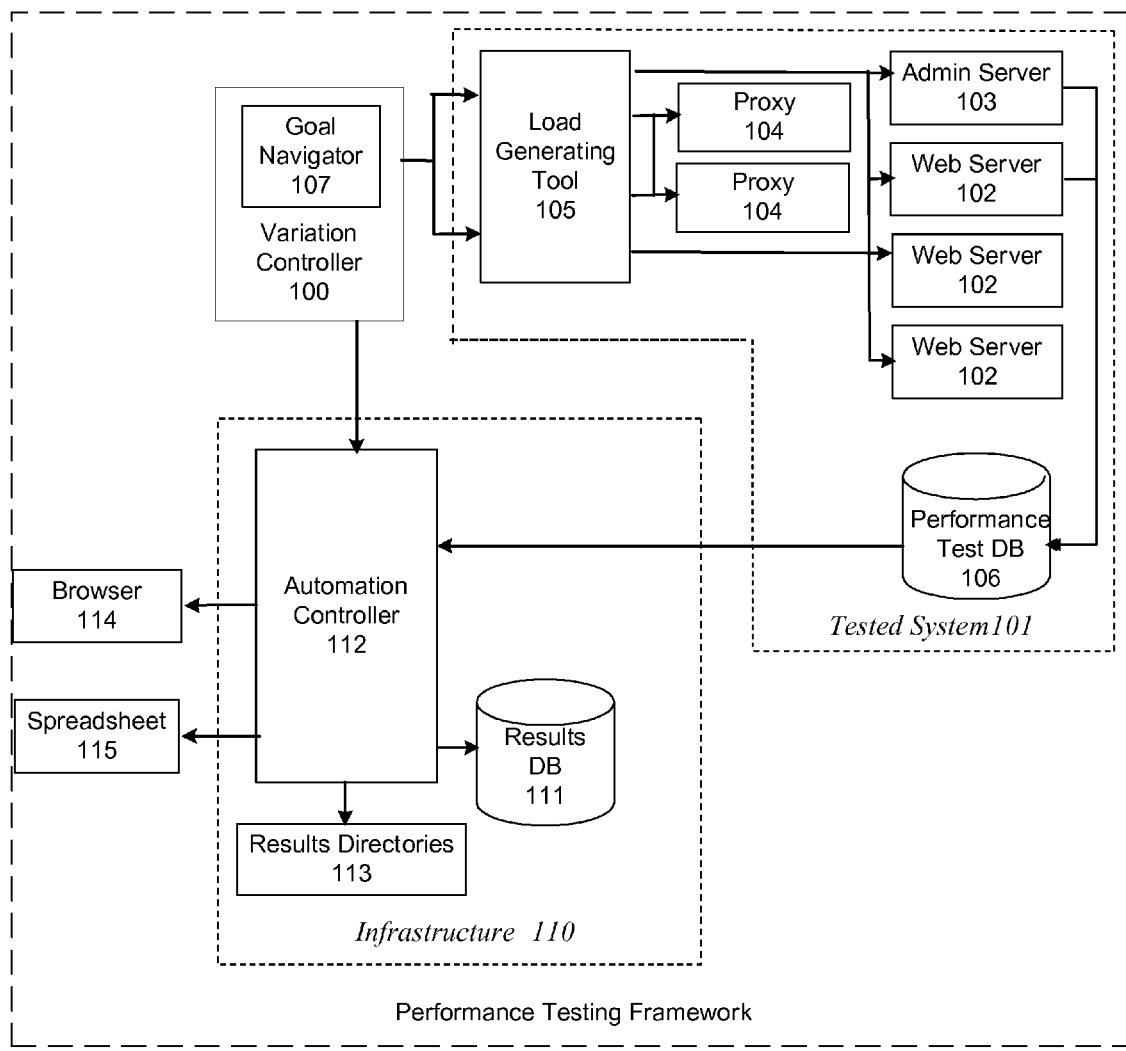
FIG. 1 is an illustration of an exemplary performance testing framework in one embodiment of the present invention.

FIG. 1 is an illustration of an exemplary performance testing framework in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, a variation controller 100, which optionally can be implemented based on a JVM, allows a user to interact with and set various testing configurations (variations) of two groups of (software) components of the performance testing framework:

Components (processes to be launched) that are part of the system 101 being tested under variations, which include but are not limited to, (managed) Web/application server(s) 102 to provide Web services to a user, admin server 103 that manages these Web services, proxy servers (proxies) 104 for the Web services provided, a load generating tool 105 that generates the load (test runs) for the performance test and conducts the performance test of the services, and a performance test database 106 that stores the test data and configuration of (repeated) test runs of the performance tests. The mapping of these tested components to host machines they reside and the configuration of the database on can be specified via a configuration file.

Components of an infrastructure 110 required to analyze the performance test results, summarize it across runs, and expose the data to facilitate analysis and comparisons between runs. These components include but are not limited to, a results database 111 that stores the analysis of performance test results and resides on a different host from the performance test database; an automation controller 112 implemented via a state machine that extracts performance test data from the performance test database 106, analyzes it, and stores the information in the results database. The automation controller is also operable to store the results in directories 113 and present them to the user on a Web browser 114 or export them to a spreadsheet 115.

Figure 2:
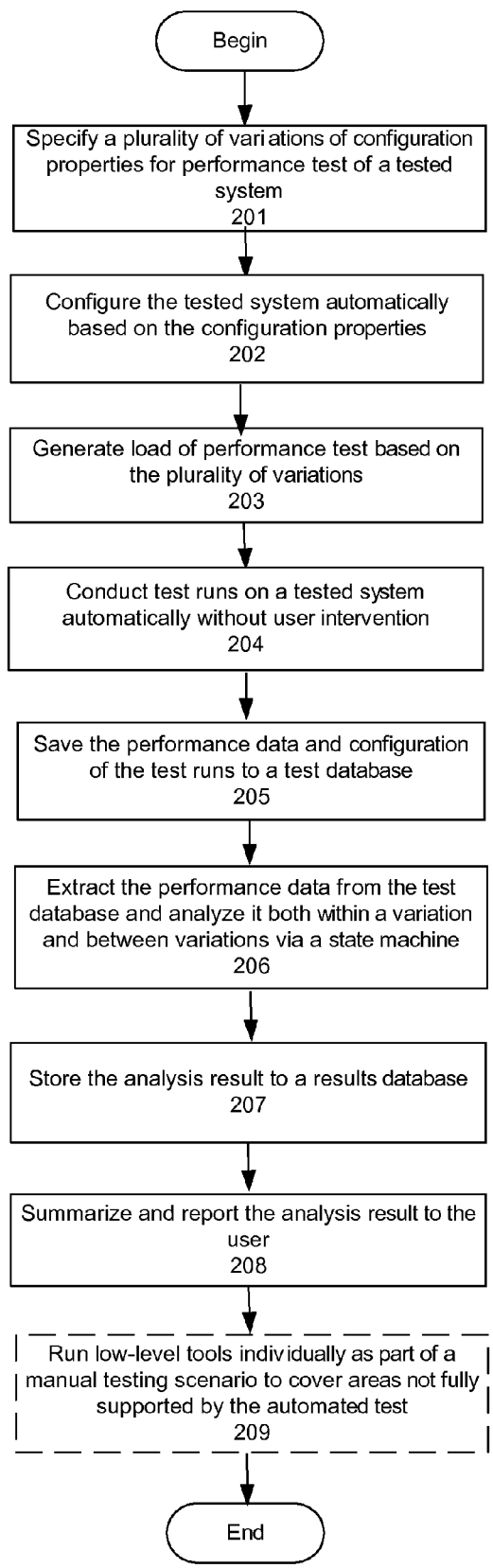
FIG. 2 is a flow chart illustrating an exemplary performance testing process in one embodiment of the present invention.

FIG. 2 is a flow chart illustrating an exemplary performance testing process in one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a plurality of variations of configuration properties for performance test of a tested system can be specified at step 201, and the system being tested can be configured automatically based on the configuration properties at step 202. Test load of the performance test can be generated step 203 based on the plurality of variations and test runs on the tested system can be conducted automatically without user intervention at step 204. The performance data and configuration of the runs can be saved to a test database at step 205. At step 206, the performance data can be extracted from the test database and analyzed both within a variation and between variations via a state machine. The analysis results can then be stored in a results database at step 207, and summarized and/or reported to the user at step 208. Optionally, low-level tools can be run individually as part of a manual testing scenario to cover areas not fully supported by the automated test runs at step 209.

Figure 3:
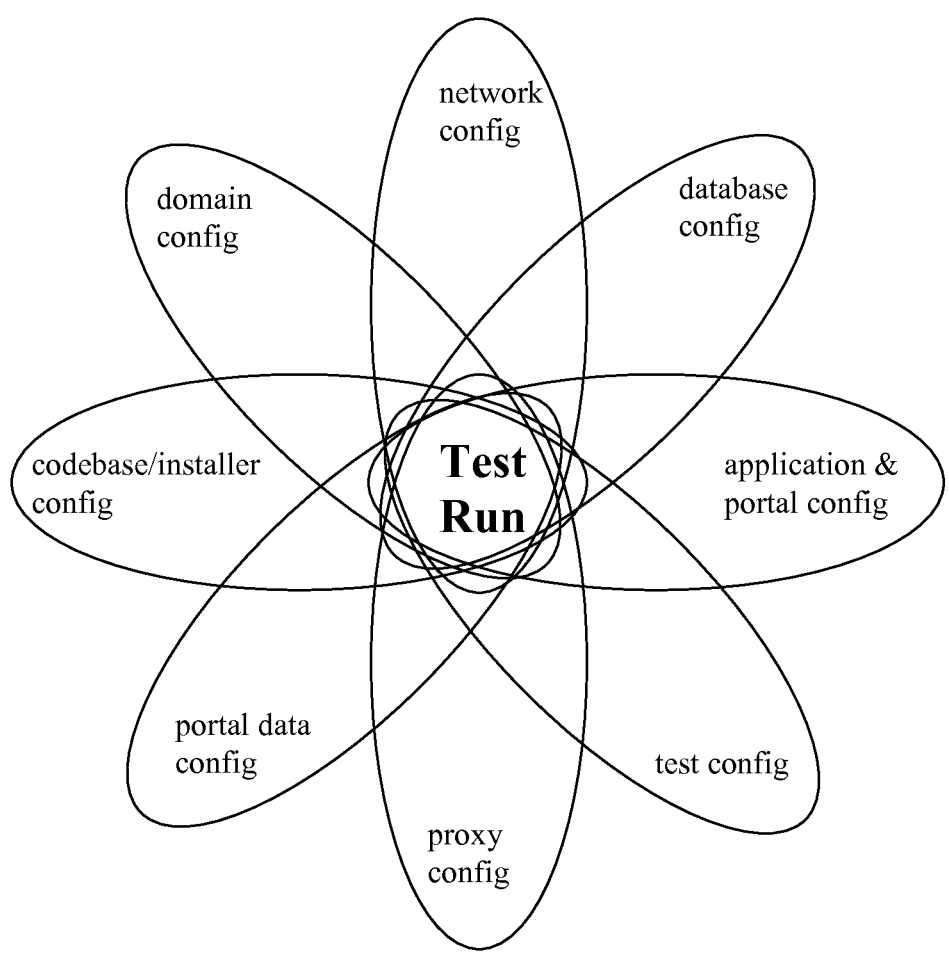
FIG. 3 shows a plurality of variations configurable for the performance testing in accordance with one embodiment of the invention.

In some embodiments, the plurality of variations of the performance testing can be configured by the variation controller 100 as shown in FIG. 3 with different installers, applications, web-applications, portals, network configurations, domains, startup scripts, databases, proxies, setups (configured portal entities), and/or performance test configuration properties (e.g., time, number of concurrent users, etc). For a non-limiting example, the variations of testing runs on an application can include changing the installer version and/or setting of the application such as portlet type, varying the # or location of managed servers, etc.

In some embodiments, a test run of a variation can either be a 'ramp-up run' or 'flat run':

- A 'ramp-up run' configures the load generating tool with a ramp-up schedule that adds additional concurrent user load as the test runs. For a non-limiting example, the test may start with 10 users and add 5 users/minute.
- A 'flat run' configures the load generating tool with a schedule using a fixed number of users and a fixed number of iterations (test script executions). For a non-limiting example, a typical test might run with 500 concurrent users, and have each user perform 6 script iterations. All 500 users start right from the start.

In some embodiments, a 'run' refers to a single performance test, generally including a single launch of load generating tool. A 'singlerun' variation will cause a single 'run' to occur, and a 'multirun' variation will cause one or more 'runs' to occur. The set of runs associated with a multirun variation is called a 'flatrunset', where all runs have a common base configuration and any properties can be varied between the various runs in a flatrunset, including but are not limited to, the number of concurrent users and think times.

In some embodiments, a variation can either be a 'singlerun variation' or 'multirun variation'.

- With a singlerun variation, the testing framework can test with either a ramp-up or a flat run.
- With a multirun variation, the testing framework tests with flat runs by automatically varying the number of concurrent users in each test run to identify loading performance, wherein:
  - A 'divide-and-conquer dispatcher' multirun can be configured to explore performance over a range of concurrent users.
  - A 'goal-based dispatcher' multirun accepts a set of response time goals, and tries to find the max number of users the system can run with while meeting each goal.

In some embodiments, performance data, which can be but is not limited to, machine loading, proxy stats, session sizes, execute queue lengths, and JVM heap sizes, is collected from various hosts running the system being tested while a test run is executing. Server and proxy log files can be monitored and scanned for issues via pattern match files, which categorize and log issues, store log files and detected issues in the results directory, and can optionally fail the run depending on severity. As a test runs proceeds, metadata, context, logs, error logs, and results information which can be but is not limited to, all configured test run files, server and proxy logs, and performance test reports, are gathered for later detailed analysis.

In some embodiments, the framework is designed to support the following usage models:

Run an entire test run automatically.

Run part of a test run automatically and part of the test run manually. For a non-limiting example, one could install and configure the domain automatically, but configure/build the app and configure/run the test manually.

Run test runs in both 'everything automatically' and 'parts of it automatically and parts of it manually' modes. There are two parts to this:

Some configuration properties which the framework can configure are left unspecified. Many configuration properties are optional, and if not specified, the framework will not apply the setting.

Not all test configuration properties can be configured by the framework, so the framework a) does not preclude this, and b) supports associating these external properties with the results information. For a non-limiting example, the framework cannot currently configure every possible setting in a load generating tool file that the load generating tool GUI can. Therefore, some configuration properties can be configured manually via the load generating tool GUI, while the framework configures various other configuration properties in the load generating tool file and leaves the 'other' properties as-is. Another non-limiting example is a Intel Xeon box's 'hyperthreading' setting at the BIOS level, which cannot currently be configured by the framework. Therefore, a user should be able to tell the framework the current setting of this in the BIOS, so this setting can get associated with the results.

Manually re-run the load generating tool using test configurations the framework has created and executed. The framework uses a 'template' and 'configured copy' model when running load generating tool. It copies the 'original template' performance test scenario and script files to a results directory, then configures them in that location, and generates the performance test analysis directory in that location. Such an approach allows one to open the performance test scenario file from the results/scenario directory and re-run the performance test scenario if desired.

Add configuration properties to extend the automation run capabilities. For a non-limiting example, it would be helpful to see how certain properties in the configuration file (e.g. config.xml) affect performance. The framework can be extended to add this configuration capability, and many others, without much difficulty.

In some embodiments, the performance testing framework can be launched/run with several target levels:

High-level targets, such as 'local-run-variations' are used to run different variations on the performance framework in a closed-loop, unattended manner by calling low-level targets.

Mid-level targets (and some associated custom ant tasks), which the framework calls to run various phases of testing, which include but are not limited to, fetch and run a platform installer; configure and build the application; configure domain, server script directories, and proxy server; and configure and run test scenario.

Low-level targets (and some associated custom ant tasks) to do specific tasks, both testing and non-testing related, which include but are not limited to, fetch and run the platform installer—'ant remote-install'; build an application—'ant remote-setup-app'; start a single server (or the domain)—'ant remote-start-domain'; configure the proxy server; and run performance tests.

In some embodiments, a Java utility can generate an application to launch/run the performance tests. The application can be generated based on template files and a configuration file (optionally generating associated .portlet and .jsp files).

In some embodiments, the performance testing framework can adopt three types of communication:

- The variation controller (which runs variations) can invoke a target on a possibly-remote host, and write ant output to a log file. It can also take a snapshot of currently-running processes on a host, which at a later time, can be used to kill any processes which are new (not in the snapshot). For a non-limiting example, the main framework Java Virtual machine (JVM) can invokes target on the proxy box in order to start/stop/configure the proxy. Even on a single host, the framework can create structured ant log files, and there is one ant log file for each phase target during a variation. For a multirun variation, there is one ant log file for each run scenarios run within the variation.
- The variation controller can start an automation controller/state machine task. For a non-limiting example, the main framework JVM can create and start a automation controller task to process the performance test results and create summary/analysis information in the Oracle results database.
- The automation controller/state machine can use SSH protocol to communicate with remote hosts as it runs tasks. For a non-limiting example, automation controller/state machine can use SSH to pull results information from the variation controller host.

In some embodiments, the performance testing framework is operable to record ant (which is a Java-based build tool) activities and output to log files for different variations. Such activities include but are not limited to, configuration metadata, phase errors, and result metadata, and associates them for quick analysis. As the framework completes phase targets and variations, ant log files are copied into the final results directory location. This provides both a good way to monitor what the framework is working on, as well as providing a record of what the framework saw during a run.

In some embodiments, the log files are arranged hierarchically, and 'roll up' output from lower-level log files. There are three primary ant log file locations, which record different levels of output as a variation is processed:

- Console output on the window of the variation controller in which the run-variations target is launched), which contains top-level runset (and variation) logging, plus everything below it.
- Variation phase target log files that contain ant output for a particular variation when running a particular phase target. If any errors were detected during a variation, the framework generates a 'ERROR' file at the top-level results directory.
- Low-level target output in host-specific directory on the receiving host side, which contains ant output when a target is remotely invoked from another a host. In other words, if the variation controller host invokes and executes a 'local-install' target on host B, its ant logging output will be written to host B's logs directory.

In some embodiments, the performance testing framework provides high-level summarizing capabilities to see how changing a test setting affected performance and errors, and see all runs associated with a test setting. Such capabilities make it easy to compare test and variation results, to 'drill down' from summarizing information to a flatrun set (group of runs) or single run contained by the summary. In addition, they enable a user to 'drill down' to a results directory to see the actual run and error information in order to identify if a run had an error, and how severe the error is.

Flexible Automated Performance Testing Process

In some embodiments, phase can be used to support changes of any test setting in a variation, which may include but are not limited to, the installer that is used, the application configuration, the proxy configuration, database configuration, and/or test configuration. Phases can be executed either manually or automatically by the performance framework in the order of:

'install'→'setupapp'→'configdomain'→'runscenarios'

Figure 4:
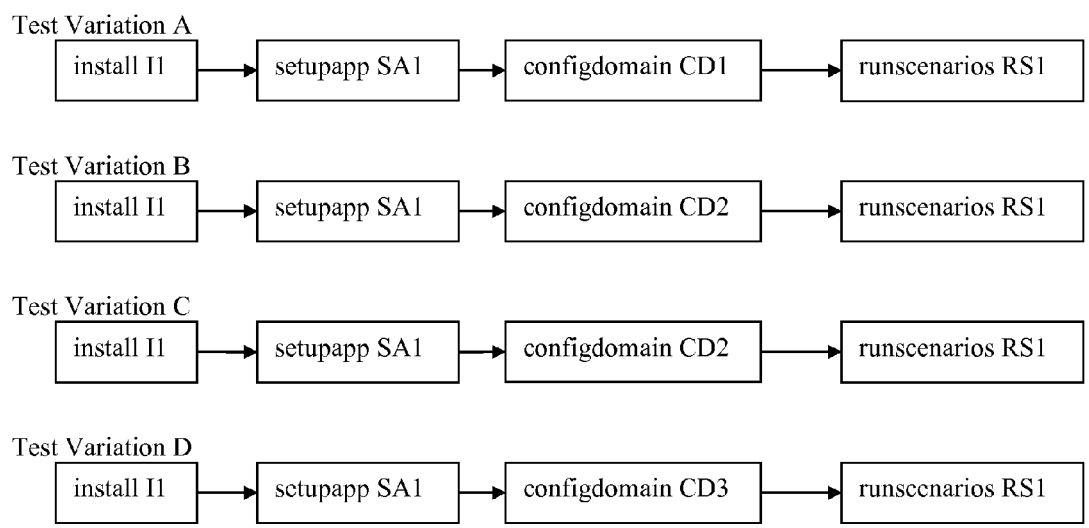
FIG. 4 shows an exemplary logical relationship between variations and phases wherein each variation logically runs each phase and can vary anything in any phase.

The framework can configure, report results and/or issues during any/all of the phases. FIG. 4 shows an exemplary logical relationship between variations and phases wherein each test runs of a variation logically runs each phase and can vary anything in any phase.

Figure 5:
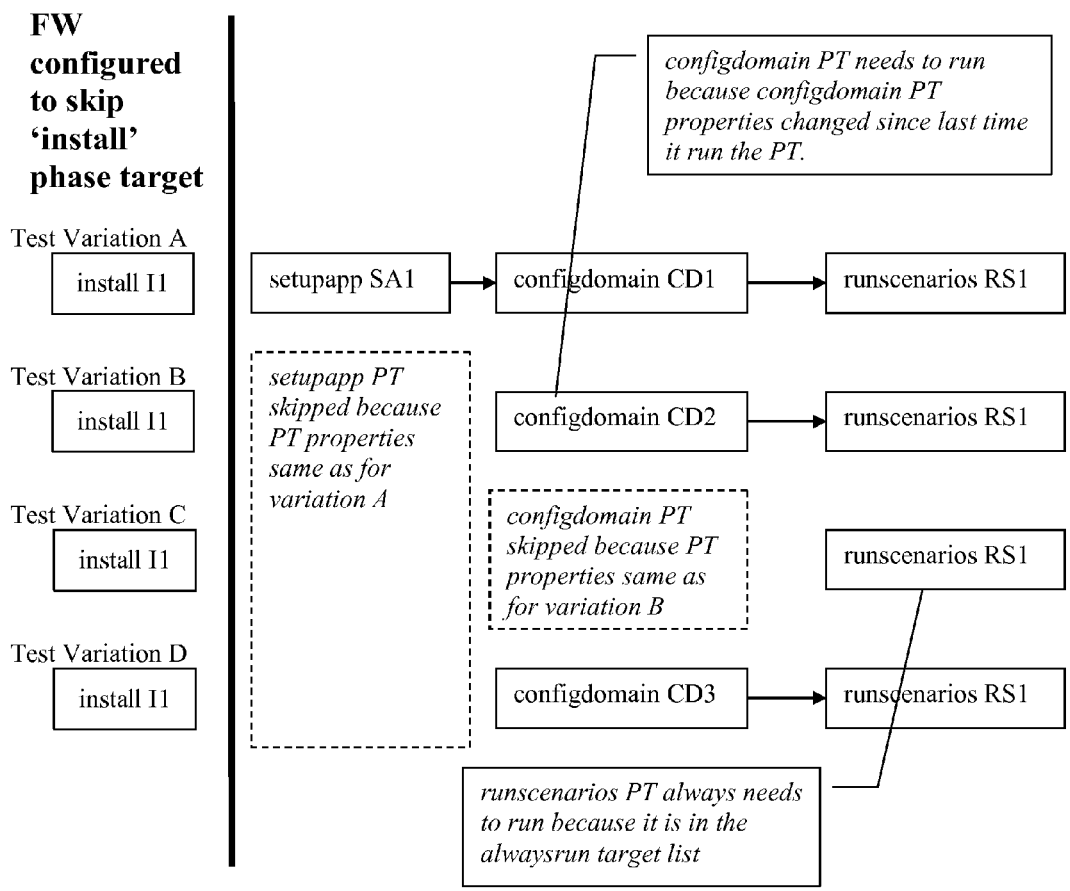
FIG. 5 shows an exemplary diagram illustrating how the set of phases can be configured, and how the framework can skip phases, allowing variations to re-use the output from previous phases.

In some embodiments, one or more of the phases above can be run manually or fully automatically and the framework can be configured to only consider certain phases for each variation. While the flexibility makes it possible to change many configuration properties, and determine their effect on performance, testing variations can be slowed considerably if each variation runs every phase (re-install, configure/build app, etc). Thus, new phases can be added and existing phases can be skipped if desired in order to achieve faster iterations and save testing time. For a non-limiting example, the 'install' and 'setupapp' phases do not need to run every time the system does a test run. A variation can execute one or more phases to apply each configuration, plus one or more test runs with that configuration. The set of phases which must be executed depends upon what the variations are changing. For another non-limiting example, for variations with different application configurations but with the same platform installation, the performance framework would need to configure and build the application ('setupapp' phase) as part of testing the performance of each variation. The remaining phases ('configdomain', 'runscenarios') would also need to be executed automatically, since they are later in the test sequence. In this case, since the variations are not changing the platform installation, the 'install' phase does not need to be executed automatically by the performance framework, and could be run once manually. FIG. 5 shows an exemplary diagram illustrating how the set of phases can be configured, and how the framework can skip phases, allowing variations to re-use the output from previous phases.

In some embodiments, each individual configuration of phases can be either fully specified or be left unspecified, in which case the default values are used. Such an approach provides an escape hatch for automation—steps which cannot be automated can be done manually, and used in conjunction with other automated pieces.

In some embodiments, there are two ways for the framework to limit the phases that are executed:

- The framework can be explicitly configured to run only certain phase targets. This can be done by configuring the property target.list (an ordered list of phases to run).
- The framework remembers the properties which were used as each phase runs. If a new variation would use the same property configuration when running a phase (such as install) as was used the last time the phase was executed, the framework will skip that phase. Optimally, during a framework run, each phase will execute for the first variation (since the configuration properties from the last run are unknown), and the framework will remember the configuration properties for future runs.

In some embodiments, a dispatcher 107 can be launched by the variation controller to manages phase execution. Its primary job is to run a group of phases for each variation, with a set of possibly-overridden properties. As it runs the phases, it records information to a 'results directory' on the host file system of the performance test. Since a dispatcher knows which phases have executed, it can 'skip' a phase if the configuration properties are the same as the last time the phase was executed (improves performance of the testing system).

In some embodiments, a dispatcher can use a template to dynamically generate the path to the results directory. It's quite flexible, and can incorporate static text, the value of static or dynamic properties, the value of property group tokens being used, date/time stamps, the value of a label in the variations file, and the variations line itself. For a non-limiting example, running results can be organized in a tree structure by the platform load, or portal size, or think time, or variation property group tokens, etc. The results directory path is configured via a template path with various token types used in the template path.

In some embodiments, a dispatcher can incorporate error monitoring/detection and handling when running phases, and incorporates error/issue severity when determining what to do next. While the dispatcher processes a variation or run, if a phase target runs into an error or an issue, the error/issue will get logged via ant (a Java component tool). Depending on the severity and the framework error severity threshold as configured in its properties, an exception may also get thrown back to the dispatcher. If this occurs, the dispatcher will record the exception information in the results directory and advance to the next variation. This allows the framework to continue processing variations even if some variations had errors.

Full Results/Configuration Storage—All Phases

In some embodiments, every component of the performance testing framework-including both the tested system 101 infrastructure 110 is configurable. Such configurations include but are not limited to:

Selecting and installing which version of software, such as a Web service platform, to test.

Generating/configuring the application to be tested, including specifying which portal/application to use and how to generate it and its associated XML files such as web.xml and application.xml.

Configuring the servers/proxies providing the test, such as which application to run on each server, which servers are part of a test.

Configuring the process running on each server, such as domain configuration/properties, server properties, DB properties, etc.

Configuring script/scenario of the plurality of test runs, such as which test script to run, how many users, etc.

In some embodiments, the configuration can be done either automatically or manually and each individual configuration steps can be skipped if desired. The manual configuration provides an "escape hatch" for configurations that the framework cannot currently automate. For a non-limiting example, a portal can be built manually before it is being tested by the framework. Alternatively, the portal can be generated automatically by the framework before testing, but with some restrictions.

In some embodiments, configuration metadata can be specified manually, which allows a user to manually configure features that cannot currently be automated and make this configuration information available for later analysis. For a non-limiting example, a user can manually select a different hyper-threading kernel on startup of a Linux server, and inform the framework that the hyper-threading is enabled or not when launching the framework. Such configuration information will be associated with the test results and can be used during analysis and data mining just like any other configuration data, even though the framework does not perform this configuration itself.

In some embodiments, all configuration metadata, artifacts and files can be associated with a performance test (data) and be recorded to support later reruns with high repeatability of exact configuration. Such configuration data includes not just the test results, but also the configuration of every component in the framework, the context in which the results are produced, which can be drilled down later to exact configuration data if so desired. In addition, all log files associated with the configuration and test can be saved on both the file system and in the database for later analysis if desired. Here, there is no distinction between the configuration of the framework and test script variation. Overall there can be approximately 500-600 configuration properties which can be used during automated configuration and there are several thousand contextual configuration properties which are being recorded (artifacts of the system configuration). Such contextual properties include but are not limited to, portal files used during test, all possible test system (e.g., load generating tool) files used in the test, proxy configuration files used during test, etc. In other words, the framework can record as many contextual configuration metadata as are available, some of which cannot currently be configured automatically.

In some embodiments, each component of the performance testing framework are pluggable and can be substituted. For a non-limiting example, a system testing tool can be used in place of the load generating tool or no testing tool is used at all.

In some embodiments, the "performance test" itself is pluggable as the framework can be used for multiple purposes. For a non-limiting example, the framework can skip performance testing and be used for the sole purpose of configuration of the Web servers and proxies. Alternatively, the framework can measure server startup times (or number of errors reported) as the test result in place of the actual performance of the servers under load test.

Centralized Configuration/Automatic Config Propagation

In some embodiments, the performance testing framework supports centralized configuration location on the host of the variation controller, and the configuration information is then propagated to other hosts of server/proxies in the framework automatically. Such a centralized configuration and propagation approach ensures that the framework properly handles configuration changes (properties can be overridden in variations) when running variations and it makes it possible to conduct performance test on servers running on a large number of hosts. In addition, this centralized configuration and propagation approach also enables varying configuration of the servers on the hosts automatically when running tests on them (such runtime configuration would otherwise be impossible otherwise). The primary features of centralized configuration include, but are not limited to:

All configuration data is in a single location, regardless of the tool in which the configuration data is eventually used, which makes the performance testing framework much easier to use with large tested systems, such as 50-500 hosts.

Centralizing configuration data is based on the ability to dynamically configure components at runtime, based on the centralized configuration data. For a non-limiting example, proxy servers and the tested system can be dynamically configured at runtime as performance test runs proceed.

Centralizing configuration data supports a common mechanism for dynamically varying configuration data at runtime, such as via variations and goal-based navigators.

Centralizing configuration data supports additional usage models, such as GUI or web-driven configuration applications.

Centralizing configuration data (and storing centralized configuration data) supports store/restore models for performance testing. For a non-limiting example, test configurations can be restored and tests can be re-executed, if results look suspect.

The performance testing framework automatically propagates the appropriate and current configuration data (possibly including dynamically modified properties) to each host in the tested system.

Centralizing configuration data supports dynamic varying the hosts participating in a performance test. For a non-limiting example, the number of hosts running a server can be dynamically increased over a series of run being executed by the framework.

Centralizing configuration data supports queued/on-demand testing as discussed later. Since configuration data is stored separately from the test components, it can be applied to a different set of test systems on a run-to-run basis.

Issue Pattern Matching and Severity Classification

In some embodiments, the performance testing framework monitors for errors/issues while it is running performance tests and classifies individual issues by severity. More specifically, the framework supports pattern-matching issue detection with a very flexible syntax, and can scan a variety of files that include that are not limited to, installer log files, database creation output, domain and server log files, proxy log files, and proxy command output for problems by using pattern match files. An error file containing the issue is created when the framework detects an issue when scanning a log file, and context information (log files, etc) is saved when an issue is detected. A detected issue may optionally affect the behavior of the framework, such as stopping the current variation and advancing to the next one.

In some embodiments, the framework can use pattern match files to scan log files and output the issues identified. New patterns as well as exclusions can be added by editing pattern matching files. If desired, pattern match scanning can be disabled for certain server and/or proxy log files. In addition, the framework can detect other issue by running phases in "try catch" blocks, which catch exceptions thrown by (ant) tasks. The framework also performs process monitoring of processes it controls; when one of these processes is detected in an incorrect state, an associated issue is created and propagated.

In some embodiments, if the framework finds an issue, it generates an error file containing the issue and where it was found. Here, an issue can be identified if a pattern is found (matched) or not found. For a non-limiting example, a Web server domain log file can be scanned for issues with a pattern match file, which searches for the string 'Error' among other things. If the framework finds one or more 'Error' pattern matches in the domain log file, it creates an error file named "domain.errors" in the domain directory with any issues that matched the pattern match file. A more complicated configuration can specifically exclude certain matches which would normally trigger as issues. For a non-limiting example, if the issue pattern 'Error' and the exclude pattern 'FooBar' are used, the text FooBarError would not be identified as an issue, since the exclude pattern matches the text.

In some embodiments, the framework can be configured to scan only a subset of a file (with start and/or end patterns). For a non-limiting example, it can scan only the part of log file from server running till server shutdown starts.

In some embodiments, the framework can classify issues by severity, which starts at 1 (highest severity—phase cannot complete) and decreases to 10 (lowest severity—minor informational messages). The pattern match (*.pm) file associate a severity with each pattern listed in the file, wherein the severity can be adjusted by editing the pattern match file. If the pattern is detected/matched, an issue of the associated severity is generated. In addition, exceptions thrown by the phases also have an associated severity.

In some embodiments, pattern match files can use patterns specified using the Java Regular Expressions Pattern regular expression format, where the patterns are specified as partial match patterns. In other words, if the pattern is 'foo bar' and the line is 'this is a test foo bar some other stuff', then the pattern matches the line, since the pattern 'foo bar' is contained in the line.

In some embodiments, the framework enables detection of 'when' the issue occurred—before startup, during startup, during test, or after shutdown commenced, based on at least four main pattern types:

Section patterns: these are patterns (e.g., startsection, endsection), which if present, specify a sub-section of the file patterns to be scanned and affect the scope in which the other patterns are applied. For the following non-limiting example,

[[[startsection]]]
[[[endsection]]]
A request has been received to force shut down of the server
Server state changed to SUSPENDING
Disconnecting from cluster There is no startsection pattern, so pattern scanning will begin at the first line. Start section patterns are useful when one is only interested in the file lines after the line "server started" occurs, and pattern scanning will continue until the line "server state changed to SUSPENDING" occurs.

Include patterns: these are patterns, which if found, will cause an issue of the associated severity to be generated (unless excluded). If a subsection is specified via startsection/endsection, then only the subsection will be scanned for include patterns. For a non-limiting example:

[[[include severity="2"]]]
(fatal)|(Fatal)|(FATAL)
(error)|(Error)|(ERROR)
(exception)|(Exception)

If any of the strings 'fatal', 'Fatal', 'FATAL', 'error', 'Error', 'ERROR', 'exception', or 'Exception' are found, possibly in a section specified by startsection/endsection, and are not matched by an exclude pattern, then an issue with severity 2 will be generated.

Exclude patterns: these are patterns, which if found, will cause an issue to not be generated. Generally these are special-case exceptions to the more general patterns listed in the 'include' section. For a non-limiting example:

[[[exclude]]]
.logErrorsToConsole
Failed to roll HTTP log file for the Web server
Failed to rename log file on attempt to rotate logs Suppose a line contains the text '.logErrorsToConsole', and suppose an include pattern 'Error' is specified. Since the line contains the include pattern 'Error', the include pattern would normally generate an issue. But by specifying the exclude patterns listed above, an issue will NOT be generated.

Required patterns: these are patterns which are expected to be present. If not found, an issue of the associated severity is generated. For a non-limiting example:

[[[required severity="2"]]]

Server started in RUNNING mode

If no matches are found for the specified pattern, then an issue of severity 2 is generated.

Issue Severity Handling

In some embodiments, the framework can incorporate issue detection and handling (or ignoring) issues throughout the automated performance testing process (performance test issues, such as failed transactions, are handled separately). Any issues detected are handled based on their severity, which enables the issues to control the performance test run process. Such control may include but is not limited to, record results but continue running the test run, stop current run and advance to next run (for multirun variations), and stop current run, advance to next variation (for singlerun variations). Issues higher than a certain severity are automatically recorded and associated with the run results. If one tries to configure the framework to run tests that may not be valid, the framework can detect any issues which occur, properly reset the system and move on to the next variation.

In some embodiments, the framework is operable to handle issues according to the following two configured severity thresholds, and any detected issues (beyond the specified severity threshold) are associated with the results and are visible during analysis:

Framework log severity threshold: which specifies the severity threshold at or below which issues should be recorded in the results database. This is used to filter error data storage to only the highest priority errors. For a non-limiting example, if threshold is set to 10, then all issues of severity 10 or below (1 . . . 10) will be recorded in the results database. Any issues are logged to the log file regardless of how this is configured.

Framework issue severity threshold: which specifies the severity threshold at or below which errors should throw an exception. This controls the issue priority which will the framework advance to the next run. An exception will generally cause the framework to stop the current run abruptly and advance to the next one, which generally means the current run will not get recorded in the results database. If an exception is not thrown, then the framework will continue processing the current run. For a non-limiting example, if the threshold is set to 3, then all errors of severity 1, 2, or 3 will cause an exception to be thrown, which will cause the current run to not get recorded in the results database.

In some embodiments, framework log severity threshold should be configured to a high number (so any errors during the runscenarios phase are recorded to the database), while framework error severity threshold should be configured to a low number (0 or 1) if error runs are be recorded in the results database, or if the framework is to ignore any issues it detects and keep running.

System Process Configuration and Processing Infrastructure (Net Config File)

In some embodiments, the performance testing framework can accommodate many different host-specific network configurations of the system being tested. Such network configuration capability provides the foundation for capacity (load) testing of components located on a large number of hosts. More specifically, it allows configuration of which components to run on each host by specifying a mapping of running processes (components) to hosts. Such mapping includes but is not limited to, which hosts are part of the system being tested, which host(s) the server instances (e.g., admin server and Web servers) will run on, directory of component locations on each host, and how each component is configured on it. It can also include the configuration of the load generating tool, and any proxy servers In some embodiments, the framework automatically configures and manages processes based on the configuration properties in network configuration file, which describes the network configuration and any host-specific and server-specific configuration properties of the tested system 101. The network configuration file can be a simple 3-level XML file:

The top level element, <networkConfig>, groups the hosts of the tested system.

The mid level element, <host>, groups tested components (servers) placed (run) on a host.

The bottom level elements represent each component running or placed on that host. More specifically, the network configuration file describes the location (and potentially some host-specific/server-specific configuration) of at least the following tested system components: admin server, Web server(s), proxy server(s), load generating tool, etc. For each server, the file may specify its individualized configuration properties, which include but are not limited to, memory and JVM to use, and which ports of the host to listen to. For each proxy server, the file may specify which type of proxy server to use, which host they will be run, etc.

In addition to the test configuration in the network configuration file, there are several hosts/servers for the performance test infrastructure not listed in the network configuration file, which the framework needs to know about. These configured as load test properties include but are not limited to: automation controller, performance test DB, and Oracle Results Database In some embodiments, a typical network configuration of the performance testing framework includes at least the following:

One primary host, this is where the variation controller runs, the framework control and configuration occurs, and the loading generating tool and analysis runs.

One or more load generating tools, if needed.

A deployed admin server.

Deployed Web server(s), and

Optionally deployed proxy server(s).

In some embodiments, the framework can run performance tests with varying network configuration of the tested system across the runs to see how various types of hosts can affect performance. For a non-limiting example, the tested system can be configured to run a number of tests (variations), using one server per host with various numbers of hosts (e.g., 1, 2, 3, 5, 10, 20, 30) hosts to see how the system scales as hosts are added. Alternatively, the system can be configured to run variations varying both the number of hosts and the number of servers per host, e.g., 2 hosts, 1 server/host==>2 total servers
2 hosts, 2 server/host==>4 total servers
2 hosts, 3 server/host==>6 total servers
. . .
4 hosts, 1 server/host==>4 total servers
4 hosts, 2 server/host==>8 total servers
4 hosts, 3 server/host==>12 total servers
. . .

Such an approach can be used to determine how the tested system scales as additional servers are added to individual hosts. Beyond a certain point, one would likely find it does not make sense to add any more servers to a host as additional host(s) would be needed.

Portal Generator

In some embodiments, the performance testing framework utilizes a portal/portlet generator to simplify portal configuration testing. More specifically, the portal/portlet generator allows portal configuration to be automatically created and used as part of the performance test. For a non-limiting example, it allows performance tests to be run with 1, 2, 5, 10, 50, 100 portlets/page.

In some embodiments, the portal generator allows portals to be generated based on a 'shape', i.e., a specified number of books/pages/portlets specified in one or more logically-identical portal file(s). Here, 'logically-identical' means the files have the same number of books/pages/portlets, though the instance IDs (and possibly definition IDs) are different. For a non-limiting example, the portal/portlet generator can be used to generate a portal file which is 3 books deep, each leaf book containing 2 pages, and each leaf page containing 10 portlets and report the total number of books/pages/portlets created.

In some embodiments, the portal generator incorporates various template files and tree configuration properties for flexible portal generation. There can be one template file for the start and the end of each 'node' in the portal tree. For non-limiting examples, there are book header and portlet footer files used at the appropriate time, which may include one or more of, book start, book end, portlet start, portlet content, portlet end, page start, page end, portal start, and portal end. For another non-limiting example, there is a portlet template file, which defines the .portlet file and any other files it references. If it is a JSP portlet, then there will also be one or more JSP files (for content, for edit, for help, etc).

In some embodiments, a portlet template directory specifies what the portlets look like if portlet generation is enabled. The portlet template directory holds template files which are laid down for each portlet that the portal generator creates, each generated portlet is placed in its own directory, with associated files. The directory includes portal files which are added at various times when building up the portal file, wherein each file specifies an XML fragment which is added at the appropriate time by the portal generator when constructing a portal file. For a non-limiting example, as the portal generator starts the portal, it adds the contents of the file named 'portal.template.portalheader'. When it starts a book, it adds the contents of the file named 'portal.template.bookheader'. When it completes a portlet, it adds the contents of the file named 'portal.template.portletfooter'. The template files can include dynamically-substituted text as well—for non-limiting examples, the 'portal.template.bookheader' file contains the text '${book.default.page}', '${book.definition.label}', '${book.title}', and '${book.menu}' which are replaced by the portal generator with dynamic text when it adds the book header file.

In some embodiments, the portal generator can either perform portlet generation for each individual portlet instance (1 per portlet), where each portlet instance would reference its own generated portlet file (portlet definition) and each .portlet file would reference its own generated JSP file for content; or use a shared instance, where each portlet instance can be configured to share a manually-created single portlet file and associated JSP.

In some embodiments, token substitutions can be performed by the portal generator and can be used within the template files. These token substitutions include but are not limited to, ${book.default.page}, ${book.definition.label}, ${book.menu}, ${book.title}, ${page.definition.label}, ${page.title}, ${portal.name}, ${portlet.contenturi}, ${portlet.instancelabel}, ${portlet.title}, and ${tree.optimization.attribute}.

In some embodiments, a portal tree reflecting the portal configuration can be logically constructed from nonleaf nodes (books/pages and portlets within a page) and leaf nodes (pages and portlets within the page), wherein nonleaf node template can be configured and multiple replicas will be created. The same goes for the leaf node template. Then a tree is generated based on the templates, a tree summary is dumped, and the utility writes out the portal file and optionally, the .portlet files and associated content.

In some embodiments, a sample configuration of a portal can include at least the following attributes: book depth (number of book levels, 1=single book), number of books per nonleaf book (book width per level), number of pages per nonleaf book, number of portlets per nonleaf page, number of pages per leaf book, and number of portlets per leaf page. In addition, the following options can also be specified: an upper bound on the total number of portlets to create, whether to use short definition and instance labels, whether to use single or multilevel menus in books, whether tree optimizations are specified and enabled, whether to share a single pre-existing .portlet file for content or to generate one portlet file (and associated content) per portlet, number of logically identical portal files to generate, and portal prefix.

In some embodiments, the portal generator allows automatic performance testing on various portal configurations, which include but are not limited to, wide but shallow portal, deep portal, and any combination of breath and depth. More specifically, the portal generator can be incorporated with the build phase of an application and variations can be used to automatically run a number of tests with varying portal configurations. A properties file specifies some portal tree characteristics, which include book depth, width (number pages/book), and number of portlets/page. For a non-limiting example, a wide but shallow portal, with a single shared pageflow portlet definition of 2 books deep, each level is 6 books+8 pages wide (+8 portlets/page), and each leaf level is 12 pages wide (+8 portlets/page) produces a portal with 7 books, 80 pages, and 640 portlets. Alternatively, a huge deep portal, with lots of unshared JSP portlets and a definition of 8 books deep, each level is 3 books+1 page wide (and 4 portlets/page), and each leaf level is 1 page wide (and 5 portlets/page) produces a portal with 3280 books, 8747 pages, and 41,549 JSP portlets (none of them shared). In fact, a bunch of logically identical portals can be created, which share no resources.

High-level Run Summaries

In some embodiments, the performance testing framework provides high-level run summarizing capabilities to summarize, query, and analyze results information both within a variation and between variations in order to bring all elements of a test run together for simplified data analysis. Such high-level run summaries supports run-by-run comparisons of test and variation results, sorting and filtering of test run results, and making it easier to identify what was going on during in the test runs. The filtering of test run results can expose the primary data only in order to reduce data overload and a user can always drill-down from summarized information to full set of data and all original log files, results and full test configuration if so desired.

In some embodiments, the high-level run summarizing capabilities supports scanning test run results for high-level patterns, provides basis for pivot-table multidimensional results analysis, which is used to demonstrate how changing a test setting affected performance and errors.

In some embodiments, the content of the high-level summaries includes but is not limited to:
- summarized run information.
- metadata of configuration properties.
- any issues and their severity during configuration and testing, which include but are not limited to, failed transactions, stopped transactions, issues and their severity.
- analyzed performance test results data, which can be saved in the results database. For a non-limiting example, the framework can creates and starts a load run automation controller task to process the performance test database and create the summary/analysis information in the results database. Results directories can then be exposed via internet for easy external access as discussed before.

Dynamic Analysis Window for Accurate Results Analysis

In some embodiments, the performance testing framework utilizes a dynamic analysis window during the test run for accurate test results analysis, which scopes results data to the most accurate data window. Such dynamic analysis window reduces error in results reported by the load generating tool. More specifically, the raw data from the load generating tool results data is analyzed based on constraints to find the window boundaries and results are reported only for the analysis window. For a non-limiting example, an 'analysis window' timeframe during a test run is computed, which covers the period when all users have completed at least one iteration and no users have started exiting. Testing results, which can be but are not limited to, average response time and standard deviation, average execute queue length, and average throughput in pages/sec can be generated for the analysis window.

In some embodiments, the dynamic analysis window component can be used to identify the most accurate time window, on which results will be based. When performance testing, often there are ramp-up, warm-up, and shutdown periods during which the system load is not constant. This component finds the time window in which the system load is constant, specifically excluding any ramp-up, warm-up, and shutdown periods for any users. This analysis window then used during statistical results analysis, and results in increased statistical results quality, less variance, and increased repeatability. The dynamic analysis window duration is used as an indicator of test quality; a short test may have an empty or very short dynamic analysis window. By lengthening the test duration, the analysis window will also increase, as will quality of the test results.

Variations Testing/Property Groups

In some embodiments, the performance testing framework allows flexibility for specifying and varying configuration properties across test runs. Some individual properties (for a non-limiting example, number of users) and associated property values can be considered a logical dimension. Other properties are typically changed in groups, and a group of properties (for a non-limiting example, various DB configuration settings) and their associated property values can also be considered a logical dimension. Combining property values for all the logical dimensions locates a n-dimensional logical intersection point at which the performance test results are identified. Each logical dimension can be represented as a 'property group', which specifies a set of properties which should be configured for a given token (value associated with a dimension), and the values associated with each of the dimensions, if not overridden, can use default preconfigured values. Here, variable testing configuration properties include but are not limited to, number of concurrent users, execute thread count, think time, and memory configuration properties. For non-liming examples, values associated with the logical dimension 'portalSize' can be 'VerySmallPortal', 'SmallPortal', 'MediumPortal', 'LargePortal', and 'VeryLargePortal', and values associated with another logical dimension can be 'thinkTime', with values '2SecondThinkTime', etc. Property groups and the values associated with them provide a way to map a logical setting, such as '2SecondThinkTime', to the actual properties which must be configured for that logical setting to take effect when the lower-level framework targets execute.

In some embodiments, a variation of configuration is composed of a set of logical dimensions, and values associated with those dimensions to be tested. The goal of a performance test is often to see how changing a single dimension affects performance. Thus the flexibility in configuration can include at least the following:
- dimensions to vary.
- various values of a dimension.
- various configuration properties that can take effect at a dimension value.

In some embodiments, the variation testing supports specifying multiple dimensions (property groups) per run. A variation specifies the logical intersection point across multiple logical dimensions at which the system should be tested. For a non-limiting example, one can use standard configuration properties for all runs except for installer and database (DB) configuration properties dimensions with one run with installer A and Oracle DB, and another run with installer B and Sybase DB.

In some embodiments, the variation testing can change the dimensions to vary. This approach is similar to starting from a base point in n-dimensional space, and moving along different dimensions from that base point to see how performance varies. For non-limiting examples, with other standard configuration properties remain the same for all runs, the value of JVM, installer, and DB setting (dimension) can be varied with at different runs. Alternatively, a user might be interested in seeing how both user 'thinktime' and '# of concurrent users' affect performance, but won't need to analyze thinktime with various numbers of users. In this case, the user can determine this by creating a single 'base variation', then varying thinktime, keeping the number of users constant, and then varying the number of users, keeping thinktime constant.

In some embodiments, a user may want to measure the performance across all possible combinations of dimensions. If a user wants to measure if dimensions are interrelated, test combinations need to be run to measure the interrelation, which also makes sense for capacity planning tests. For a non-limiting example, the user might be interested in seeing how both user thinktime and '# of concurrent users' affect and modeling how changing one dimension affects another by creating 'thinktime' and 'numusers' dimensions and exploring them a n-dimensional region in space, across all dimensions. This type of testing typically results in many runs (combinatorial explosion across dimension values), and is especially sensitive to adding dimensions. There are at least two possible ways to reduce the number of variations in a combinatorial set:

Try to reduce the number of dimensions involved in the combinations. Maybe a few 'explore deltas off a base point' variations for a dimension can suffice instead of an 'all possible combinations with this dimension'.

If possible, reduce the number of dimensional values (property group tokens) along a dimension. For a non-limiting example, instead of testing with very small, small, medium, large, very large, testing with very small, medium, and very large will result in much fewer combinations.

In some embodiments, the variation testing supports a 'pick and choose' model for selecting which configurations to test. Rather than use a combinatorial model (test all possible combinations of all the dimensions), such a model selects each test point. In addition, variations can be dynamically added/edited/removed while the performance testing is running.

In some embodiments, the variation testing allows one to define his/her own dimensions for easier configuration by configuring multiple properties of one dimension. For a non-limiting example, a number of properties can be set for DB type dimension (Oracle, Sybase, DB2), which include but are not limited to, DB host, DB port, DB type, DB driver name and DB driver URL. In fact, pretty much any possible setting in any phase of the performance testing can be varied, wherein such configuration properties include but are not limited to, the installer to use, the application and its configuration being tested (including portal generator properties), net (system network/process) configuration file, database properties, server configuration properties (JVM, memory, etc), and test properties (test script, number of users, etc)

In some embodiments, the variation testing supports running multiple variations, which are test runs with possibly different variations of configurations. Multirun variation provides the foundation for fully automated 24×7 unattended testing, which enables a single person to run multiple tests on multiple clusters simultaneously and shifts the bottleneck in performance testing from human effort to hardware and time. For a non-limiting example, one can configure 50 tests, start performance testing, and come back a few days later to examine results.

RangeFinder: Quick Rampup to Find Range

In some embodiments, a range finder can be used to find a quick ranged snapshot of the performance of the tested system. It is an optimization to run capacity tests of the system more quickly, especially with flatrun tests where the number of users is constant. It can find a "best guess" range estimate of how many users the tested system can handle in a very quick timeframe. For a non-limiting example, the range finder can measure the performance of the tested system under 1000 concurrent users to be within the timeframe of 0.5-1.5 second of response time. Alternatively, it can find that the tested system is operable to achieve 0.5 second of response time within a load of 500-2000 concurrent users.

In some embodiments, the range finder can be used in conjunction with multirun variations to quickly get a rough approximation of system performance. More specifically, the range finder utilizes a ramp-up schedule to quickly find result estimates as the # of concurrent users is increased. It does this with a given set of inputs for the number of users, speed of ramp-up, and desirable response time required. The framework then runs one test with those configuration settings and then computes a range of flatruns to run later. For a non-limiting example, suppose the goal is to see how many users the system can support at a 2 second response time. The parameters can be as follows: up to 5000 concurrent users, adding 3 users every 1 second. The framework then would run the tests with those parameters and return that 3000 users (for a non-limiting example) can be supported at 2 seconds or less. A threshold should then be used to determine how wide of a range should be used based on the number 3000 users to then go and, based on what the result is, do flatruns +/−25% of that result and space them every 50 users. In this case it would be 3000 as the median 2250 as the minimum and 3750 as the maximum. The flatruns would be defined as 2250, 2300, 2350 . . . up to 3750. This results in a considerable time savings as compared to doing from 0 to 5000 every 50 (like the spread dispatcher performs).

In some embodiments, the information from the range finder can be incorporated used by a goal navigator discussed above to zero-in more accurately on its goals when running a series of performance tests. Consequently, the goal navigator can find its goals more quickly since it starts out with more accurate capacity estimates. In addition, as each goal navigator test run is typically quite long, the utilization of the range finder to provide a best guess range can be a major timesaver and save considerable amount of test time in some circumstances, especially with flatruns.

Multirun Variations/Pluggable Goal Navigator

In some embodiments, the performance testing framework can vary certain test configuration properties automatically in a series of test runs to accomplish a configured goal. The performance goals can include but are not limited to, identifying the maximum number of concurrent users with a specified response time, drawing the concurrency vs. response time graph by filling in details and reducing granularity over time till a specified threshold is met, varying the number of users over a configured range by a specified increment.

In some embodiments, the performance testing framework can set up a feedback loop via a goal navigator, which analyzes data and decides what to do next. More specifically, the goal navigator examines runs, goals, errors, and results of performance tests, and decides next setting (and configuration) to test with. It can accommodate multiple goals and configurable goal accuracy thresholds to dynamically determine when goals have either been met or are unreachable. It can also vary multiple configuration properties and tolerate various degrees of errors during the test configurations. In addition, special error feedback allows the goal navigator to incorporate error type, severity, and frequency in its determination as whether a goal is unreachable.

In some embodiments, the variation controller has a special type of variation which uses the pluggable goal navigator to dynamically configure and execute zero or more runs, and dynamically determine when the variation (set of runs) is complete. The pluggable dispatcher can be used to dynamically identify various runs to perform, and provides a feedback loop so the dispatcher can select runs as appropriate. The dispatcher notifies the controller when it determines no more runs are necessary.

In some embodiments, the pluggable goal navigator supports many pluggable performance-based goals, which include but are not limited to, maximizing throughput, minimizing response time, minimizing startup times, and minimizing variance (maximizing consistency). There are also some pluggable test-based navigators which could be used to maximize errors, attempt to identify factors affecting reproducibility in an intermittently-failing test, and try to maximize test coverage with configurations (databases, platforms, etc) which have not been tested in awhile.

Goal-Based Dispatcher

In some embodiments, a specialized type of goal navigator, goal-based dispatcher, can be utilized to focus on varying setting across runs to find the best setting values to achieve one or more goals. The goal-based dispatcher is a concrete implementation of one of many possible pluggable goal navigators, which focuses on modifying a configuration property to best meet response time goals. It is a focused, complex component, which handles the complicated business of drawing conclusions and making estimates from partially inaccurate data. Here, there is no restriction as which setting can be changed. A multirun goal-based dispatcher can accepts multiple goals and try to find the max number of users the system can run with while meeting each goal. Here, the multiple goals which can be but are not limited to different response times. For non-limiting examples, the goals can be throughput or startup time, and 0.5, 1, 2, 5 second response times.

In some embodiments, the goal-based dispatcher incorporates awareness and situational analysis in closed-loop testing when deciding what to perform in the next test run. It can automatically decide when it is done testing, which may happen when some goals are unreachable and it has achieved all the rest of the goals. For a non-limiting example, the goal-based dispatcher may decide that some goals have already been met and continue working on others. External storage allows the performance testing framework to automatically resume at any later time and restart the goal-based dispatcher with all previous knowledge.

In some embodiments, the goal-based dispatcher may attempt to find concurrent user sizes which match up with one or more response time goals. Such response time goal-based dispatcher uses configured or dynamically-identified min/max values, then repeatedly selects values (number of concurrent users) to match one or more goal response times with concurrent user sizes. Over time, it gets closer to the goal values, eventually zeroing in on them, or deciding they are unreachable. For a non-limiting example, one can configure the goal-based dispatcher to find out how many concurrent users the framework can support with a given configuration and 2, 5, and 10-second response time goals. After a number of runs, the dispatcher may determine that 3381 users matches up with a 2-second response time, and 4387 users matches up with a 5-second response time. It may decide the 10-second response time goal is unreachable because any runs with more than 5000 users had serious errors (and the 10-second response time goal would require more than 5000 users).

In some embodiments, the time it takes to do a run can be constrained by the maximum number of iterations and/or the maximum variation time (the maximum time spent dynamically varying configuration to meet goals). For a non-limiting example, if one have this set at 4 hours, but a run takes 8 hours, then the performance testing framework would advance to the next variation after the run completes. Since runs with higher response times generally take much longer to run (linear increase in run time), it's generally better to under-shoot the top goal response time than overshoot it. Additionally, it helps if the exploration is not extremely aggressive—this avoids significantly overshooting the correct number of users.

In some embodiments, the goal-based dispatcher periodically reports its goal assessment by writing results to a database table. The results (how many users the dispatcher thinks each response time goal supports) can be viewed with an spreadsheet while the tests are running. In addition, the goal-based dispatcher refines its best-fit estimates of configuration properties for each goal. By sharing this best-fit data as it progresses, the goal-based dispatcher supports a usage model in which the system can (given enough time) find the optimal settings, but can be stopped at any point if one decides the system resources should be used for another purpose. If at a later point, additional accuracy is desired, the testing can be restarted and the goal-based dispatcher will pick up where it left off and continue refining its best-fit estimates for each goal.

In some embodiments, the goal-based dispatcher includes goal accuracy configuration and error severity/count configuration. It assesses whether a run has errors. while performing test runs. Its error run (run with error) assessment is configurable at least in the following ways:

Error runs can either be 'hard' (no response time data, generally due to too many transaction failures), or 'soft' (response time data, but there were other issues).

Error runs can add an upper error bound to the explored area. In other words, an error run (if repeated enough times at a value) will cause the dispatcher to set an upper limit on the number of users. This may cause the dispatcher to decide certain goals are unreachable due to this limit. One can specify the number of times an error run (hard or soft) must be found at a value (number of users) before the value becomes an upper bound.

One can configure what types of issues will cause a run to be considered a soft error run. For a non-limiting example, one can require there to be at least 50 failed transactions in a run before it is considered a soft error run.

In some embodiments, the goal-based dispatcher can be configured to analyze the run data, even if it has errors. The framework can be configured to log all errors (so the dispatcher can see them) but not throw exceptions it detects, except for the really serious ones. The error repeatability threshold, run handling and soft failure configuration properties can also be configured.

In some embodiments, the goal-based dispatcher works in at least the following objectives, each of which is configurable:

Bound response time goal values (find one response time below the minimum goal, and another above the maximum goal). The dispatcher can start with the configured min/max hints and explore if needed.

Select values at evenly-spaced intervals along the global range, in order to get a good global best-fit line. The number of values (unique number of users) to try in the global range is configurable.

Ensure the global range best-fit line quality meets a quality threshold if configured.

Divide the global-range into sub-ranges by drilling down based on what appears to be the most optimal sub-range for each goal. Each sub-range has a configurable minimum number of values, and a configurable best-fit line quality threshold.

Refine the most optimal goal sub-range till it meets the quality thresholds.

Find a final goal sub-range, with a configurable max size, and configurable number of tested values.

Monitor the best-fit line quality over a configurable number of runs, ensuring it changes by less than a configurable percentage.

The goal-based dispatcher considers a response time goal as complete when it gets through the final objective. It can also dynamically re-evaluate each objective each time it receives new data, and will re-attempt to meet a previously-met objective if data indicates the objective is no longer being met. This supports usage in a testing environment with a high degree of variance.

Optimizing Explorer

In some embodiments, an optimizing explorer can be used as a specialized goal navigator to determine the optimal configurations and configuration boundaries of a tested system. As the tested system runs, it continually updates/reports the 'best known configuration properties so far during the performance test. It adopts the "start it and forget it" model, which will save the best configuration properties for a tested system based on the performance testing results and report the optimal configuration when the user comes back in a few weeks.

In some embodiments, optimizing explorer can be configured with the following:

- A starting point (group of configuration properties) of the system configuration.
- Performance metric (how to measure success) of the tested system, which includes one or more of: maximum throughput, average response time, minimum startup time, and average number of concurrent users.
- a set of one or more configuration properties to keep constant (implicitly).
- a set of one or more configuration properties to vary and how much to vary each of the set of one or more configuration properties.
- when to stop varying the configuration properties, e.g., less than 0.05% performance increase in any dimension or after 5000 test runs.

In some embodiments, the optimizing explorer is operable to start a series of test runs from the starting point and moving across the various dimensions of the configuration space. It identifies the optimal dimension(s) to change, and then moves in the direction to increase performance and re-tests at the current point in space if needed. More specifically, it records the test data externally so it can restart at any time and pick up where it left off. As the optimizing explorer learns about the performance of the system within its configuration space, it records correlation information indicating how much change in any given dimension affects the performance at a given point. From this information, the optimizing explorer builds a correlation model to identify which factors had the largest affect on performance across the configuration space. In addition, the optimizing explorer also identifies validity boundaries of the configuration space as it records certain points in the space where some configuration properties become invalid.

In some embodiments, the optimizing explorer is operable to periodically re-evaluate its performance data at each point in configuration space, determines if additional performance probing on one or more dimensions at that point is necessary, then selects the next point to move to.

Dimensional Explorer

In some embodiments, each configuration setting can be considered as a 'dimension', and a variation composed of N configuration properties can then be represented as a point in N-dimensional configuration space. From this point in space, one configuration setting is adjusted by any move in a single dimension. For a non-limiting example, if one moves along the 'user think time' dimension while keeping all other configuration properties (installer version, portal size, number of concurrent users, etc) constant, the user think time setting (and this setting only) is changed.

In some embodiments, a dimensional explorer can be used as a specialized goal navigator to analyze one or more of: how various configuration (logical) properties affect performance at a given point, how sensitive the configuration properties are to change, and report this information. More specifically, the dimensional explorer is operable to perform a series of runs to find and report cost/benefit information by navigating/moving across multiple dimensions from a starting point in the space (group) of configuration properties. It measures success (performance metric) of the performance test based on one or more of performance measures of the tested system: maximum throughput, average response time, minimum startup time, and average number of concurrent users. In some embodiments, the dimensional explorer provides at least the following primary features:

- From a given configuration (c), how varying each of (n) explicitly specified properties over a specified range will affect performance. A single explicitly-specified property is varied at a time.
- For each explicitly specified property (p) which is varied, which range of values of (p) was valid. Some settings of (p) may cause failures in the tested system.
- For each explicitly specified property (p) which is varied, over the valid range of values of (p), how sensitive the system performance was to changes in property (p). Some properties may have a large effect on performance; others may have no effect. The sensitivity is weighted, so values closer to (c) are weighted more heavily.

In some embodiments, the dimensional explorer can be configured with the following:

- a set of one or more configuration properties to keep constant (implicitly).
- a set of one or more configuration properties to vary.
- how much to vary each of the set of one or more configuration properties.
- when to stop varying the configuration properties, e.g., after 200 test runs.

In some embodiments, the dimensional explorer records its data externally so it can be restarted at any time and pick up where it left off. As the explorer learns about the performance of the tested system with its space of configuration properties, it records correlation information indication how much changing any given dimension affects the performance of the tested system. In the meantime, it also learns how sensitive the specified performance metric is to a given config setting, and uses this information when changing each setting. Some configuration properties, such as number of servers, are very sensitive to changes wherein tiny changes can result in large performance changes. For non-limiting examples, varying the number of servers from 2-4 can have a performance impact of 180% [0% to 180%] and varying the number of execute threads from 5-50 can have a performance impact of 30% [−20% to +10%]. In contrast, some other configuration properties, such as cache size (measured in bytes), are very insensitive to changes as huge changes need to be made before performance differences are detectable. For non-limiting examples, varying the cache size from 1000-500,000 bytes can have a performance impact of 5% [−2% to +3%] and varying session replication can b have a performance impact of 0% [0% to 0%]. Such information on configuration sensitivity can either be specified or determined automatically as the test runs.

In some embodiments, the dimensional explorer measures and tolerates data variability across the space of the con figuration properties during performance tests. For a non-limiting example, test results may normally vary by 5% and the dimensional explorer can periodically measure such data variation, incorporate it in its analysis, and reports it in its results.

Queued/On-Demand Testing

In some embodiments, the performance testing framework supports running tests across multiple test sets as resources become available, separating the configuration the test sets from the execution of the test sets. Here, each test includes all phases of testing, which include but are not limited to, fetch and run a platform installer; configure and build the application; configure domain, server script directories, and proxy server; and configure and run test scenario. Such an approach increases resource utilization and test productivity, making maximum test parallelism possible.

In some embodiments, the performance testing framework incorporates running multiple test sets simultaneously across resources. For a non-limiting example, four test sets can be run across 50 machines in parallel. In addition, resource management and resource classes can be incorporated, wherein each test run reserves resources for the duration of the test run and releases them when the test run completes. If a test is unable to execute because not enough resources are available, the framework will try to run other tests instead. Resources can also be assigned to a <test set>, which means other test sets cannot reserve them. For a non-limiting example, one large capacity test may require 40 machines, which leaves only 10 for all other tests that also want to run.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "controller" is used in the embodiments of the systems and methods described above, it will be evident that such concept can be interchangeably used with equivalent concepts such as, class, method, type, interface, bean, component, object model, and other suitable concepts. While the concept "components" is used in the embodiments of the systems and methods described above, it will be evident that such concept can be interchangeably used with equivalent concepts such as, bean, class, method, type, process, object model, and other suitable concepts. While the concept "configuration" is used in the embodiments of the systems and methods described above, it will be evident that such concept can be interchangeably used with equivalent concepts such as, property, attribute, annotation, field, element, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to support performance testing of an application, comprising:
one or more application servers operable to deploy and execute the application, wherein the one or more application servers are configured using a plurality of configuration properties, wherein the plurality of configuration properties of the one or more application servers are represented as a configuration space defined by a set of logical dimensions, and wherein each logical dimension in the configuration space represents a configuration property of the one or more application servers and each point in the configuration space represents a test run based on a particular variation of the plurality of configuration properties of the one or more application servers; and
a load generating tool operable to generate and execute a first set of test runs to measure performance of the application, wherein the first set of test runs are performed based on a plurality of variations of the plurality of configuration properties of the one or more application servers; and
a variation controller operable to:
record correlation information for the first set of test runs, wherein the correlation information indicates how much change in each logical dimension of the configuration space from a first point in the configuration space affects the performance of the application; and
build a correlation model among the plurality of configuration properties of the one or more application servers, based on the recorded correlation information, and identify a first configuration property that has the largest affect on the performance of the application at the first point in the configuration space in the first set of test runs.

2. The system according to claim 1, wherein:
the one or more application servers provide a web-based application to the user.

3. The system according to claim 1, wherein:
the plurality of configuration properties of the one or more application servers include one or more of: database type, server configuration, network configuration, application configuration, and test configuration.

4. The system according to claim 1, wherein:
each of the set of logical dimensions is associated with a set of preconfigured properties and associated values.

5. The system according to claim 1, wherein:
the variation controller is operable to add, edit, remove, or modify one of the plurality of variations dynamically while the test run is running.

6. The system according to claim 1, wherein:
each of the set of logical dimensions, if not overridden, use default preconfigured values.

7. The system according to claim 1, wherein:
the set of logical dimensions are user-defined with preset default values, wherein explicitly specified values override the preset default values for the set of logical dimensions.

8. The system according to claim 1, wherein:
the variation controller measures performance of the application by one or more of: response time, throughput, capacity, and scalability.

9. The system according to claim 1, wherein:
a plurality of variations starts from a base point in the configuration space, and moves along different logical dimensions to evaluate how performance of the application varies.

10. The system according to claim 1, wherein:
the variation controller identifies validity boundaries of the configuration space.

11. The system according to claim 1, wherein:
the variation controller can further
    specify a second plurality of variations of the plurality of configuration properties of the one or more application servers, wherein the second plurality of variations use different values for the first configuration property;
    allow the load generating tool to generate and execute a second test run that is associated with the second plurality of variations; and
    select an optimized configuration for the one or more application servers from the second plurality of variations.

12. The system according to claim 1, wherein:
the plurality of configuration properties of the one or more application servers includes:
    number of application servers;
    number of execute threads; and
    cache size.

13. The system according to claim 1, wherein:
each logical dimension of the configuration space represents a range of values of a particular configuration property of the one or more application servers, and each point in the configuration space represents a particular variation of the plurality of configuration properties of the one or more application servers.

14. A method to support performance testing of an application, comprising:
    providing one or more application servers that are operable to deploy and execute the application, wherein the one or more application servers are configured using a plurality of configuration properties, wherein the plurality of configuration properties of the one or more application servers are represented as a configuration space defined by a set of logical dimensions, and wherein each logical dimension in the configuration space represents a configuration property of the one or more application servers and each point in the configuration space represents a test run based on a particular variation of the plurality of configuration properties of the one or more application servers;
    generating and executing, via a load generating tool, a first set of test runs to measure performance of the application, wherein the first set of test runs are performed based on a plurality of variations of the plurality of configuration properties of the one or more application servers;
    recording, via a variation controller, correlation information for the first set of test runs, wherein the correlation information indicates how much change in each logical dimension of the configuration space from a first point in the configuration space affects the performance of the application; and
    building, via a variation controller, a correlation model among the plurality of configuration properties of the one or more application servers, based on the recorded correlation information, and identify a first configuration property that has the largest affect on the performance of the application at the first point in the configuration space in the first set of test runs.

15. The method according to claim 14, further comprising:
adding, editing, removing or modifying one of the plurality of variations dynamically.

16. The method according to claim 14, further comprising:
allowing the set of logical dimensions to be defined by a user, wherein explicitly specified values of the one or more of the set of logical dimensions override their default values.

17. The method according to claim 14, further comprising one or more of:
    summarizing and reporting an analysis result to a user;
    presenting an analysis result to the user on a Web browser; and
    exporting an analysis result to a spreadsheet.

18. The method according to claim 14, further comprising:
measuring the performance of the one or more application servers by one or more of: response time, throughput, capacity, and scalability.

19. The method according to claim 18, further comprising:
starting a plurality of variations from a base point in the configuration space, and moving along different logical dimensions to evaluate how performance of the application varies.

20. A non-transitory machine readable medium having instructions stored thereon that when executed cause a system to:
    provide one or more application servers that are operable to deploy and execute the application, wherein the one or more application servers are configured using a plurality of configuration properties, wherein the plurality of configuration properties of the one or more application servers are represented as a configuration space defined by a set of logical dimensions, and wherein each logical dimension in the configuration space represents a configuration property of the one or more application servers and each point in the configuration space represents a test run based on a particular variation of the plurality of configuration properties of the one or more application servers;
    generate and execute, via a load generating tool, a first set of test runs to measure performance of the application, wherein the first set of test runs are performed based on a plurality of variations of the plurality of configuration properties of the one or more application servers;
    record, via a variation controller, correlation information for the first set of test runs, wherein the correlation information indicates how much change in each logical dimension of the configuration space from a first point in the configuration space affects the performance of the application; and
    build, via a variation controller, a correlation model among the plurality of configuration properties of the one or more application servers, based on the recorded correlation information, and identify a first configuration property that has the largest affect on the performance of the application at the first point in the configuration space in the first set of test runs.

21. A system to support performance testing, comprising:
means for providing one or more application servers that are operable to deploy and execute the application, wherein the one or more application servers are configured using a plurality of configuration properties, wherein the plurality of configuration properties of the one or more application servers are represented as a configuration space defined by a set of logical dimensions, and wherein each logical dimension in the configuration space represents a configuration property of the one or more application servers and each point in the configuration space represents a test run based on a particular variation of the plurality of configuration properties of the one or more application servers;

means for generating and executing, via a load generating tool, a first set of test runs to measure performance of the application, wherein the first set of test runs are performed based on a plurality of variations of the plurality of configuration properties of the one or more application servers;

means for recording, via a variation controller, correlation information for the first set of test runs, wherein the correlation information indicates how much change in each logical dimension of the configuration space from a first point in the configuration space affects the performance of the application; and means for building, via a variation controller, a correlation model among the plurality of configuration properties of the one or more application servers, based on the recorded correlation information, and identify a first configuration property that has the largest affect on the performance of the application at the first point in the configuration space in the first set of test runs.

\* \* \* \* \*

UNITED STATES PATENT AND TRADEMARK OFFICE
CERTIFICATE OF CORRECTION

PATENT NO.        : 8,676,530 B2
APPLICATION NO.   : 11/626281
DATED             : March 18, 2014
INVENTOR(S)       : Roth et al.

Page 1 of 1

It is certified that error appears in the above-identified patent and that said Letters Patent is hereby corrected as shown below:

In the Specification

In column 1, line 6, delete "of" and insert -- of pending --, therefor.

In column 10, line 64, delete "50-500" and insert -- 50-100 --, therefor.

In column 12, line 52, delete " (error)|Error)|(ERROR)" and insert --(error) | (Error) | (ERROR)--, therefor.

In column 14, line 17, delete "servers" and insert -- servers. --, therefor.

In column 14, line 47, delete "Database" and insert -- Database. --, therefor.

In column 18, lines 14-15, delete "LargePortal'," and insert -- 'LargePortal', --, therefor.

In column 19, line 34, delete "etc)" and insert -- etc). --, therefor.

In column 22, line 10, delete "errors. while" and insert -- errors, while --, therefor.

Signed and Sealed this
Twenty-ninth Day of July, 2014

Michelle K. Lee
*Deputy Director of the United States Patent and Trademark Office*